(12) United States Patent
Willis et al.

(10) Patent No.: US 7,756,394 B1
(45) Date of Patent: Jul. 13, 2010

(54) DVD NAVIGATION INFORMATION FOR IMPROVED TRICK MODES

(75) Inventors: Donald Henry Willis, Indianapolis, IN (US); Mark Alan Schultz, Carmel, IN (US); Jianlei James Xie, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1773 days.

(21) Appl. No.: 10/130,016

(22) PCT Filed: Nov. 2, 2000

(86) PCT No.: PCT/US00/30413

§ 371 (c)(1),
(2), (4) Date: Sep. 13, 2002

(87) PCT Pub. No.: WO01/35650

PCT Pub. Date: May 17, 2001

Related U.S. Application Data

(60) Provisional application No. 60/164,791, filed on Nov. 10, 1999.

(51) Int. Cl.
*H04N 5/915* (2006.01)
*H04N 5/76* (2006.01)
*H04N 5/85* (2006.01)

(52) U.S. Cl. .......................... 386/70; 386/68

(58) Field of Classification Search ............ 386/68, 386/71, 73, 77, 82, 95, 124, 125, 69, 70
See application file for complete search history.

(56) References Cited

U.S. PATENT DOCUMENTS 4,872,067 A * 10/1989 Okatani ................. 386/70
5,535,008 A * 7/1996 Yamagishi et al. ........ 386/109
5,596,564 A * 1/1997 Fukushima et al. ........ 386/70
5,870,523 A    2/1999 Kikuchi et al. ............ 386/95
6,002,834 A * 12/1999 Hirabayashi et al. ....... 386/70
6,078,727 A *  6/2000 Saeki et al. .............. 386/125

(Continued)

FOREIGN PATENT DOCUMENTS

EP        724 264 A2     7/1996

(Continued)

OTHER PUBLICATIONS

Knuth, D. E. _The Art of Computer Programming_. Reading, MA, Addison-Wesley, 1973. vol. 1, pp. 251-252. QA76.6.K64.*

(Continued)

*Primary Examiner*—Mehrdad Dastouri
*Assistant Examiner*—David N Werner
(74) *Attorney, Agent, or Firm*—Robert D. Shedd; Robert B. Levy; Jorge Tony Villabon (57) ABSTRACT

A method for providing improved trick mode performance in a DVD having a plurality of video object units where each of the VOBUs contains a navigation pack. The method involves storing on the DVD within each navigation pack certain supplemental disc search information. The SDSI can include one or more of the following: a picture structure of the VOBU; a number of fields to be displayed from each picture in a normal play mode; and a number of groups of pictures contained in said VOBU.

24 Claims, 5 Drawing Sheets

U.S. PATENT DOCUMENTS

| | | | |
|---|---|---|---|
| 6,222,979 B1 * | 4/2001 | Willis et al. | 386/46 |
| 6,308,005 B1 * | 10/2001 | Ando et al. | 386/95 |
| 6,327,421 B1 * | 12/2001 | Tiwari et al. | 386/68 |
| 6,389,218 B2 * | 5/2002 | Gordon et al. | 386/68 |
| 6,512,883 B2 * | 1/2003 | Shim et al. | 386/95 |
| 6,621,979 B1 * | 9/2003 | Eerenberg et al. | 386/68 |
| 6,654,539 B1 * | 11/2003 | Duruoz et al. | 386/68 |

FOREIGN PATENT DOCUMENTS

| | | | |
|---|---|---|---|
| EP | 838948 A1 * | 4/1998 | |
| EP | 866 461 A2 | 9/1998 | |
| WO | WO 9957724 A1 * | 11/1999 | |

OTHER PUBLICATIONS

Bismuth, A. and Ng, G. 'Designing DVD player trick plays', Jan. 1999, Electronics Engineer [online] [retrieved on Nov. 28, 2006]. Retrieved from the Internet: <URL: http://www.eetasia.com/ARTICLES/1999JAN/1999JAN01_ID_DSP_MSD_EMS_TA.PDF>.*

Search Report.

* cited by examiner

○ TABLE 4.5-1 : DSI　　　　　　　　　　　　　(DESCRIPTION ORDER)

|  | CONTENT | NUMBER OF BYTES |
|---|---|---|
| DSI_GI | DSI GENERAL INFORMATION | 32 BYTES |
| SML_PBI | SEAMLESS PLAYBACK INFORMATION | 148 BYTES |
| SML_AGLI | ANGLE INFORMATION FOR SEAMLESS | 54 BYTES |
| VOBU_SRI | VOB UNIT SEARCH INFORMATION | 168 BYTES |
| SYNCI | SYNCHRONOUS INFORMATION | 144 BYTES |
| RESERVED | RESERVED | 471 BYTES |
|  | TOTAL | 1017 BYTES |

FIG. 5
(Prior Art)

DSI_GI　　　　　　　　　　　　　　　　　　　(DESCRIPTION ORDER)

|  | CONTENT | NUMBER OF BYTES |
|---|---|---|
| (1) NV_PCK_SCR | SCR_BASE OF NV_PCK | 4 BYTES |
| (2) NV_PCK_LBN | LBN OF NV_PCK | 4 BYTES |
| (3) VOBU_EA | END ADDRESS OF VOBU | 4 BYTES |
| (5) VOBU_1STREF_EA | END ADDRESS OF THE FIRST REFERENCE PICTURE IN VOBU | 4 BYTES |
| (5) VOBU_2NDREF_EA | END ADDRESS OF THE SECOND REFERENCE PICTURE IN VOBU | 4 BYTES |
| (6) VOBU_3RDREF_EA | END ADDRESS OF THE THIRD REFERENCE PICTURE IN VOBU | 4 BYTES |
| (7) VOBU_VOB_IDN | VOB ID NUMBER OF THE VOBU | 2 BYTES |
| RESERVED | RESERVED | 1 BYTES |
| (8) VOBU_C_IDN | CELL ID NUMBER OF THE VOBU | 1 BYTES |
| (9) C_ELTM | CELL ELAPSE TIME | 4 BYTES |
|  | TOTAL | 32 BYTES |

| SDSI_GI | |
|---|---|
| VOBU_NGOP | NUMBER OF GOP IN THE VOBU |
| GOP_PS | GOP PICTURE STRUCTURE |
| VOBU_NF | NUMBER OF FIELDS TO BE DISPLAYED FOR EACH PICTURE WHEN NOT IN TRICK MODE |

FIG. 8

| GOP_PS | |
|---|---|
| GOP_FMT | FORMAT OF EACH GOP (OPEN OR CLOSED) |
| GOP_SEQ | SEQUENCE OF PICTURE TYPES (I, P, AND B) FOR EACH GOP |
| GOP_SA_PIC | START ADDRESSES FOR EACH PICTUERE OF THE GOP |
| GOP_EA_PIC | END ADDRESSES FOR EACH PICTURE OF THE GOP |

FIG. 9

DVD NAVIGATION INFORMATION FOR IMPROVED TRICK MODES

This application claims the benefit under 35 U.S.C. §365 of International Application PCT/US00/30413, filed Nov. 2, 2000, which claims the benefit of U.S. Provisional Application 60/164,791, filed Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and with out any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

A group of pictures (GOP) stored on DVD media is typically contained within a logical unit referred to as a video object unit (VOBU). Typically, the VOBU contains about 12 or 16 pictures, together with associated audio data. Further, each VOBU begins with exactly one navigation pack (NV_PCK). The NV_PCK conventionally contains presentation control information (PCI) as well as disc search information (DSI) for the video object unit in which they are included. The presentation control information contains details of the timing and presentation of a program. The disc search information is composed of relative addresses of NV packs of VOBUs in the forward and backward directions. Each NV_PCK also includes the data size of the first reference picture in a GOP and the end address for the first three reference pictures in the VOBU. This is the only clue given as to the structure of the VOBU.

The disc search information is useful in performing "trick" modes of playback, that is, any mode of disc player operation other than normal play, stop and pause. One aspect of conventional disc search information (DSI) is that it helps the decoder to find I pictures within the VOBU corresponding to the current NV_PCK. The NV_PCK also contains data which helps the decoder to find VOBUs far into the future or past of presentation, relative to the current VOBU. The VOBUs in the past relative to the current VOBU presentation are referenced in fields of the NV_PCK known as the BWDI (backward information). The VOBUs in the future relative to the current VOBU presentation are referenced in fields of the NV_PCK known as FWDI (forward information). The conventional DSI data does permit, to a limited extent, special display modes involving reproduction of video. For example, in conventional systems, fast forwarding and rewinding are made possible by reproducing only the reference I pictures of VOBUs having a predetermined time interval between them. The predetermined time interval chosen is generally a function of the relative rate of forwarding and rewinding. However, because of the limited amount of information contained within conventional NV_PCKs the flexibility of display in trick modes is severely limited. For example, the NV_PCK data does not include much information regarding the internal structure of each GOP contained within a VOBU.

SUMMARY OF THE INVENTION

The invention concerns a method for providing improved trick mode performance in a DVD having a plurality of video object units (VOBU) where each of the VOBUs contains a navigation pack. The method involves storing on the DVD within each navigation pack certain supplemental disc search information (SDSI). The SDSI can include one or more of the following: a picture structure of the VOBU; a number of fields to be displayed from each picture in a normal play mode; and a number of groups of pictures (GOP) contained in said VOBU.

According to one embodiment, the picture structure portion of the SDSI can be comprised of information concerning a format of each GOP contained within said VOBU; a sequence of picture types in each said GOP in the VOBU; start addresses for each picture of said VOBU; and end addresses for each picture of said VOBU.

According to one aspect, the method can further include processing the SDSI for determining selected ones of the pictures contained in the GOPs to be presented in response to a user selected trick mode. For example, the SDSI can be used for determining a minimum number of pictures contained within each the VOBU. According to an alternative embodiment, the minimum number of pictures contained within one the VOBU can be determined by counting I and P pictures contained in the VOBU.

The method according to the invention can further include the step of determining a selected number of pictures contained in a GOP which can be displayed for a selected trick mode. Based on this determination, the trick mode presentation may selectively involve displaying only I-pictures and P-pictures contained in the GOP. This would be the case if, for example, the selected trick mode speed is too fast to permit all pictures within the GOP to be decoded and displayed in real time. For even faster trick modes, the presentation may be limited to displaying only a fractional number of I-pictures and P-pictures contained in the GOP if the selected trick mode speed is too fast for displaying all of the I-pictures and P-pictures. According to a preferred embodiment, the selected pictures contained in the GOP to be displayed are determined before beginning the decoding and display of the VOBU containing the GOP. According to another aspect of the invention, the method can also include the step of processing the SDSI to calculate the size of each picture. This information can be used for managing a data buffer of a DVD device to optimize at least one of a picture jumping sequence and a number of pictures stored in the buffer responsive to a selected trick mode. This information can also be used for determining other information useful for managing a data buffer including which set of the pictures contained within a GOP is to be displayed, which of the pictures held in memory are for multiple decoding, and how much memory is needed to store a desired one of the pictures.

According to an alternative embodiment, the invention can also include a DVD device for providing improved trick mode performance. The DVD device has special processing facilities provide for storing certain SDSI on the DVD within each navigation pack. The SDSI can include one or more of the following:

a picture structure of the VOBU; a number of fields to be displayed from each picture in a normal play mode; and a number of groups of pictures (GOP) contained in said VOBU.

According to one embodiment, the picture structure portion of the SDSI can be comprised of information concerning a format of each GOP contained within said VOBU; a sequence of picture types in each said GOP in the VOBU; start addresses for each picture of said VOBU; and end addresses for each picture of said VOBU.

According to one aspect, the DVD device can further include processing facilities for processing the SDSI for determining selected ones of the pictures contained in the GOPs to be presented in response to a user selected trick mode. For example, the SDSI can be used for determining a minimum number of pictures contained within each the VOBU. According to an alternative embodiment, the minimum number of pictures contained within one the VOBU can be determined by counting I and P pictures contained in the VOBU.

The DVD device according to the invention can further include processing facilities for determining a selected number of pictures contained in a GOP which can be displayed for a selected trick mode. Based on this determination, the trick mode presentation may selectively involve displaying only I-pictures and P-pictures contained in the GOP. This would be the case if, for example, the selected trick mode speed is too fast to permit all pictures within the GOP to be decoded and displayed in real time. For even faster trick modes, the presentation may be limited to displaying only a fractional number of I-pictures and P-pictures contained in the GOP if the selected trick mode speed is too fast for displaying all of the I-pictures and P-pictures. According to a preferred embodiment, the selected pictures contained in the GOP to be displayed are determined before beginning the decoding and display of the VOBU containing the GOP.

According to another aspect of the invention, the DVD device can also include facilities for processing the SDSI to calculate the size of each picture. This information can be used for managing a data buffer of the DVD device to optimize at least one of a picture jumping sequence and a number of pictures stored in the buffer responsive to a selected trick mode. This information can also be used for determining other information useful for managing a data buffer including which set of the pictures contained within a GOP is to be displayed, which of the pictures held in memory are for multiple decoding, and how much memory is needed to store a desired one of the pictures.

DETAILED DESCRIPTION OF THE PREFERRED EMBODIMENTS

Recordable DVD Device

Figure 1:
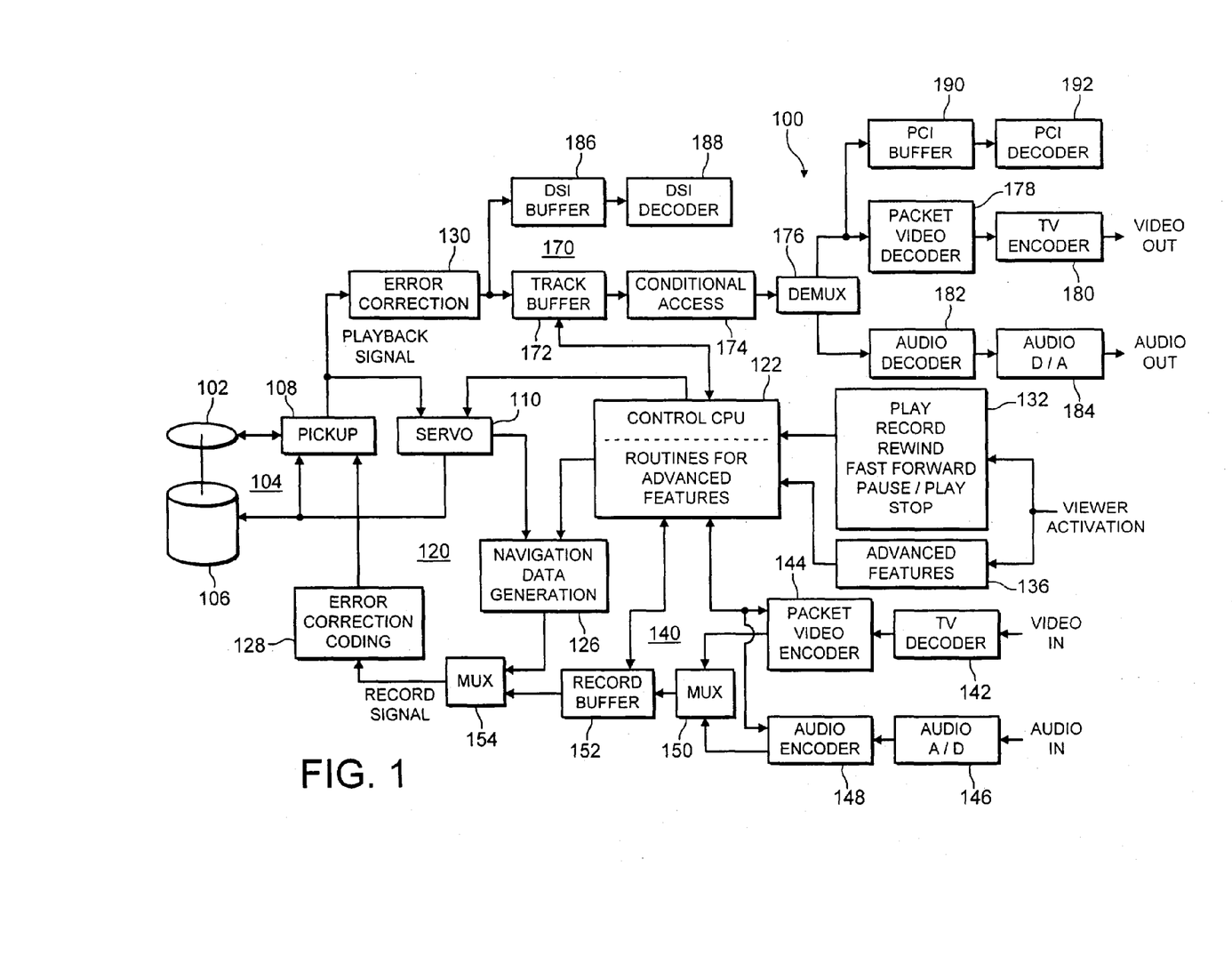
FIG. 1 is a block diagram of a rewritable DVD device that can be provided with one or more advanced operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140.

In conventional recordable DVD devices, the navigation data generation circuit 126 will generate conventional navigation packet data to be stored on the disc with the video data. In accordance with the inventive arrangements, the navigation data generation circuit can supply certain additional information for inclusion in the navigation packet. The additional information can be used for improved performance for selected trick mode playback operations as shall subsequently be described in more detail.

The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152. Control and data interfaces are also preferably provided for permitting CPU 122 to control the operation of packet video encoder 144 and audio encoder 148. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, slow play, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of audio and video data packets are created, they are combined in MUX 154 with appropriate navigation packets generated in the navigation data generation block 126. The packets are then sent on to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is a number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing.

Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. A PCI buffer 190 and PCI decoder 192 can be provided for decoding presentation control information contained in navigation packets contained on the disc. The output processing path 170 can be deemed to include the error correction circuit 130, as noted.

DSI buffer 186 is provided for receiving disc search information (DSI) contained within the navigation packets. The DSI decoder 188 is used for decoding the DSI information contained within navigation packets which shall be described in more detail below.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embodied in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
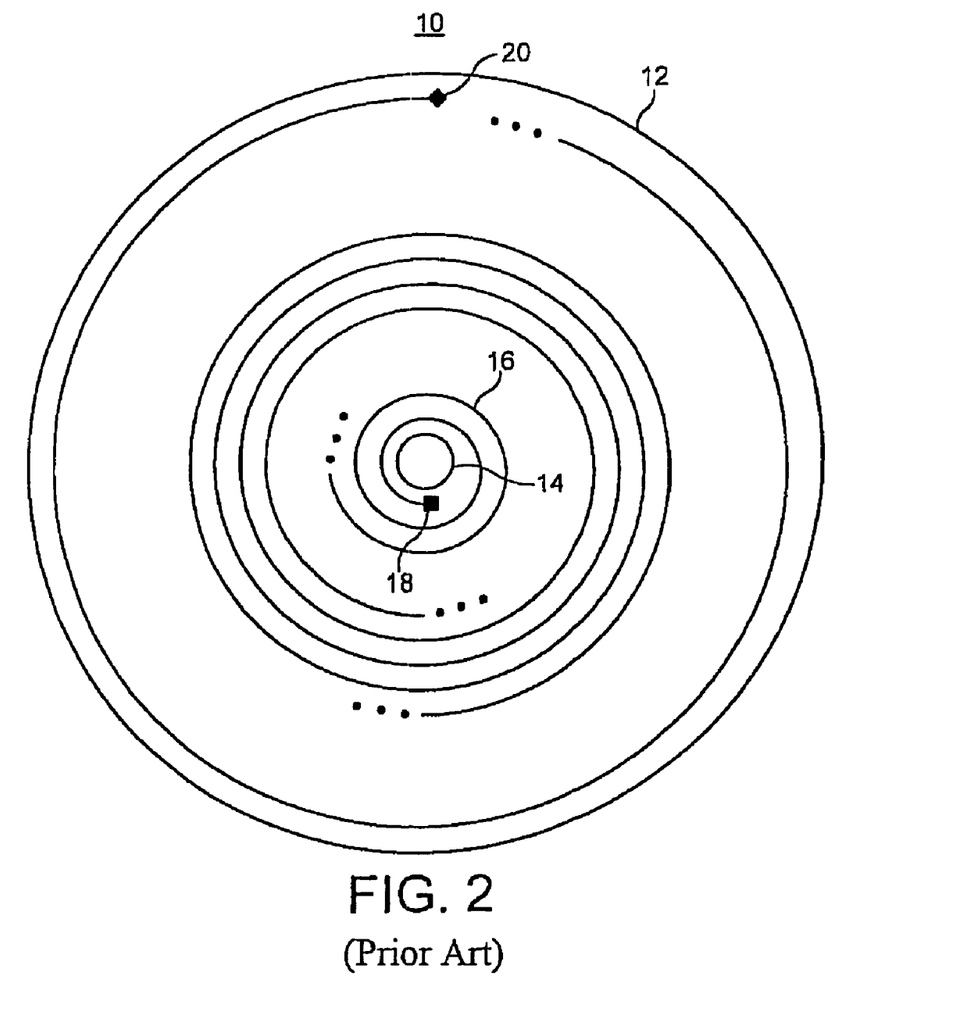
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (_ _ _) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advanced features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

The inventive arrangements have been described herein relative to recordable DVD media. Those skilled in the art will appreciate, however, that the invention is not limited in this regard. Rather, the improvements to DVD navigation information for improved trick modes as described herein can be used with any type of disc media, including but not limited to DVD-R type media.

DVD Data Structures

Figure 3:
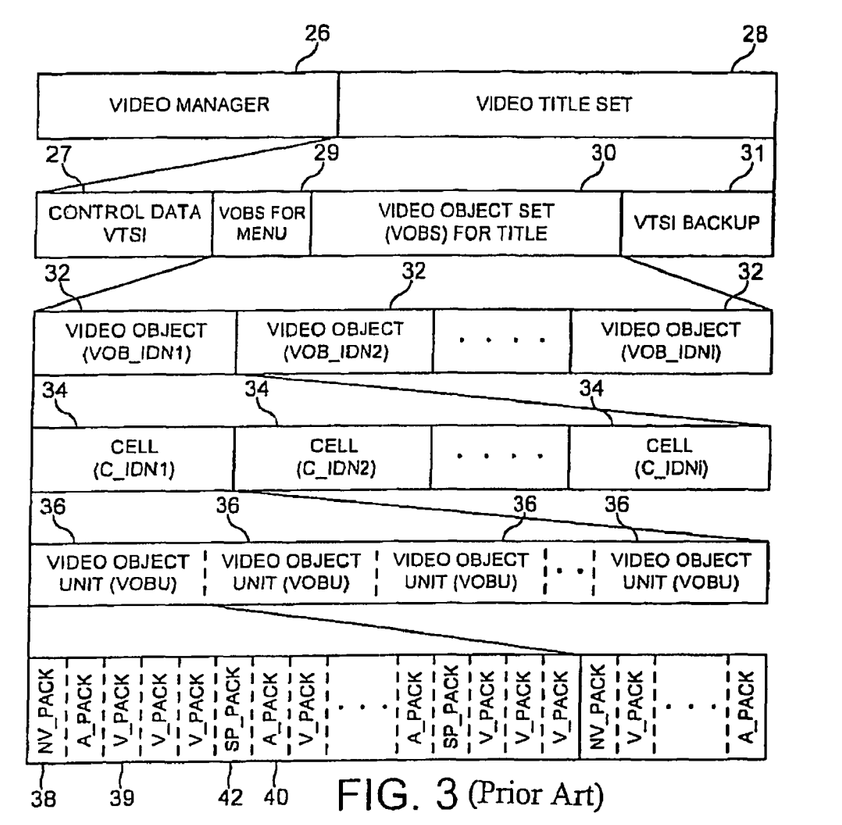
FIG. 3 is a diagram useful for explaining the organization of video object units in video object sets.

As shown in FIG. 3, each DVD contains a video manager 26 and video title set (VTS) 28. The VTS includes video title set information (VTSI) 27, an optional video object set for menu 29, one or more VOBS for title 30 which contains the actual title content, and a VTSI backup 31. Each VOBS 30 is comprised of a plurality of video objects 32. Each video object 32 includes a plurality of cells 34. Each VOBS also includes a collection of pointers to cells. In this way, the VOBS data links cells together and indicates in what order the programs or cells are to be played. Cells within a particular VOBS can be flagged for play in any desired order. For example, they can be played sequentially or randomly.

Each cell includes a plurality of VOBUs 36. Each of the VOBUs 36 in which the video content of the disc resides typically contains 0.4 to 1.0 seconds of presentation material. Each VOBU 36 is a sequence of data packs in recording order. Each VOBU starts with exactly one navigation pack (NV_PCK) 38 and could encompass all of the following kinds of packs, including video packs (V_PCK) 39, audio packs (A_PCK) 40 and sub-picture packs (SP_PCK) 42. Each VOBU is nominally comprised of one group of pictures (GOP).

Figure 4:
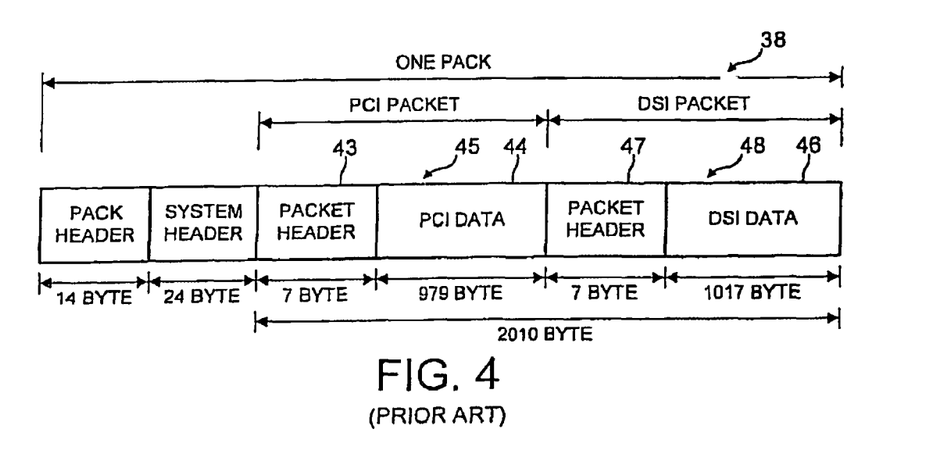
FIG. 4 illustrates the structure of the navigation pack of FIG. 3.
Figure 5:
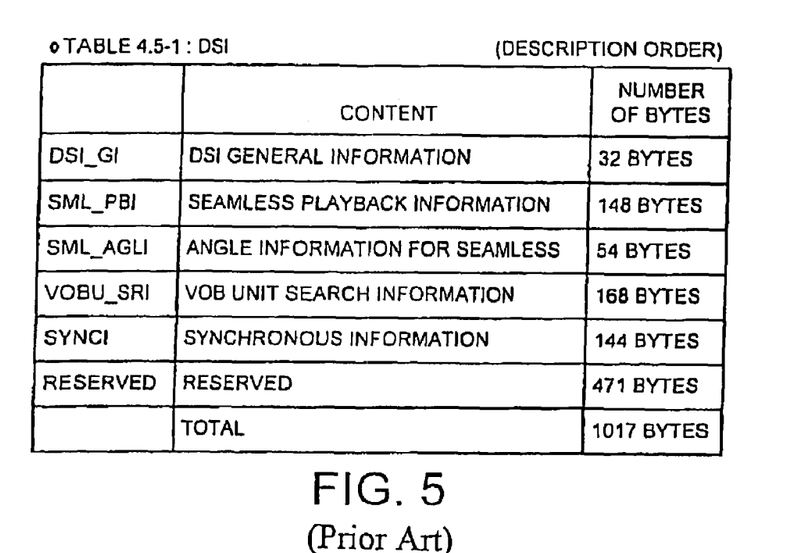
FIG. 5 illustrates the content of the disc search information (DSI) data field in FIG. 4.
Figure 6:
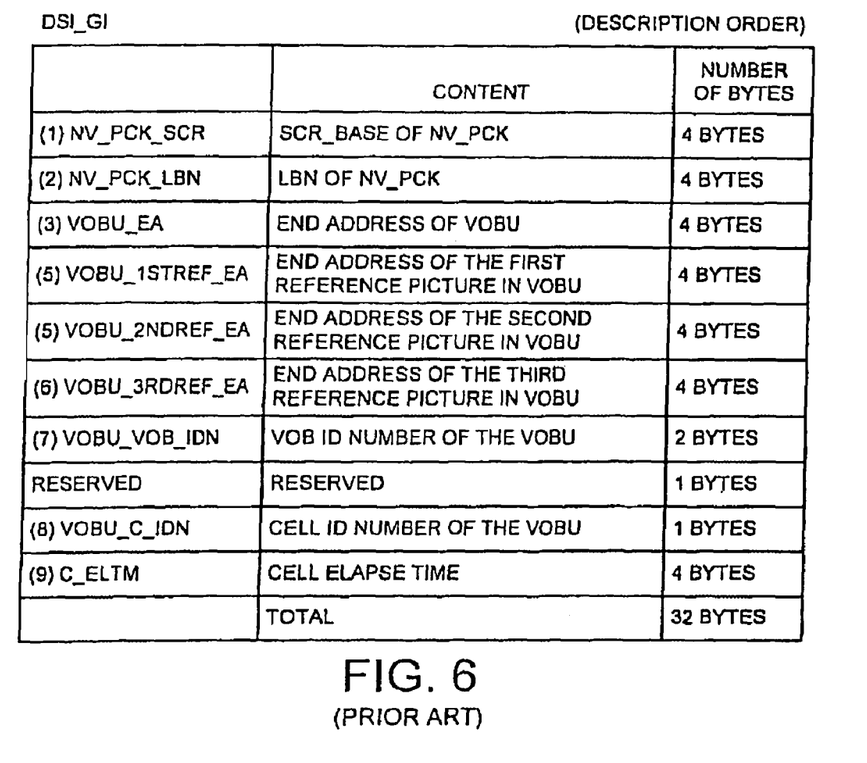
FIG. 6 illustrates the content of the DSI general information (DSI_GI) data in FIG. 5.

FIGS. 4-6 illustrate the structure of a conventional NV_PCK 38. As shown in FIG. 4, the NV_PCK 38 includes a PCI packet 45 and a DSI packet 48. The PCI packet includes a packet header 43 and PCI data 44. The DSI packet 48 similarly includes a packet header 47 and DSI data 46.

FIG. 5 illustrates the content of the disc search information (DSI) data field in FIG. 4. The DSI data comprises several parameters including DSI general information (DSI_GI) 70. FIG. 6 illustrates the content of the DSI general information (DSI_GI) data in FIG. 5. The DSI_GI contains various information as is known in the art, including the end addresses of the first, second and third reference pictures in the VOBU 36. These parameters are identified in FIG. 6 as VOBU_1STREF_EA, VOBU_2NDREF_EA, VOBU_3RDREF_EA. It should be understood that the precise data structures shown in FIGS. 4, 5 and 6 are exemplary and the invention is not intended to be so limited. Rather, any other suitable data structure arrangement may be used for this purpose.

Improvements To DVD Navigation Information for Improved Trick Modes

To make the existing NV_PCK more useful for trick modes in accordance with the inventive arrangements, additional information is included therein. In particular, such additional data can include: the number of GOPs contained in the VOBU; the picture structure for each such GOP; and the number of fields to be displayed from each picture (1, 2 or 3) in a normal play mode. Such information as relates to the inventive arrangements shall be referred to herein as supplemental disc search information (SDSI). The invention can be used in connection with non-recordable disc media such as DVD-R, recordable disc media such as DVD-RAM, DVD-RW, DVD+RW, and any other suitable disc medium for storing data.

Figure 7:
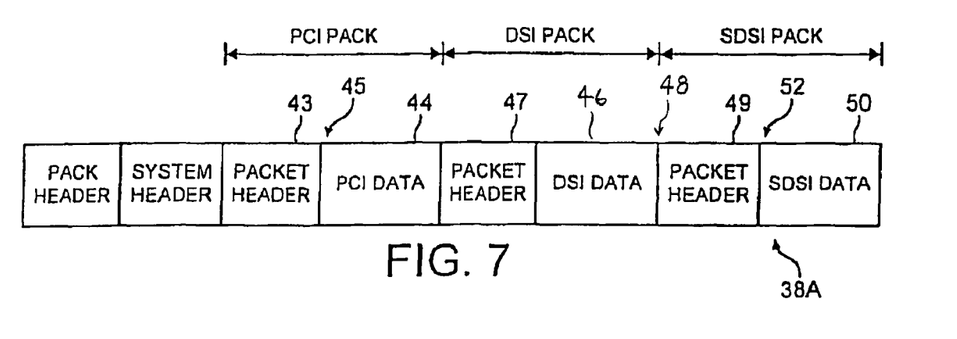
FIG. 7 illustrates the structure of a navigation pack in accordance with the inventive arrangements.
Figure 8:
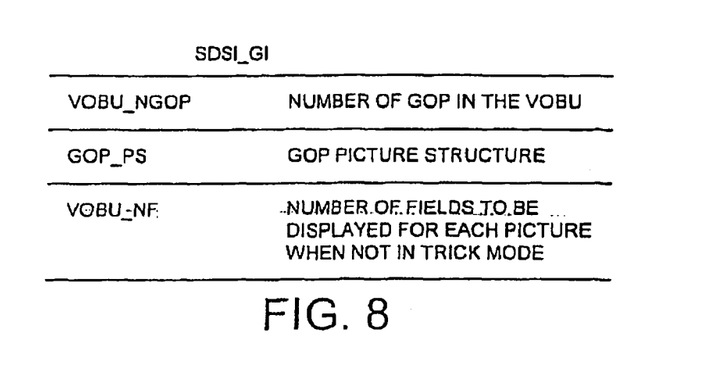
FIG. 8 illustrates the content of a supplemental disc search information (SDSI) field in accordance with the inventive arrangements.

The SDSI data can be added to the NV_PCK 38 in any suitable manner. According to one embodiment, the data can be added as a separate SDSI packet 52 as shown in FIG. 7. If a separate SDSI packet is used, a packet header 49 can be provided together with SDSI data 50. SDSI data 50 is preferably comprised of at least an SDSI general information (SDSI_GI) field as shown in FIG. 8. In an alternative embodiment, the SDSI_GI field can simply be appended to the existing DSI Data 46 as an SDSI general information (SDSI_GI) field.

Referring now to FIG. 8, it can be seen that the SDSI GI contains various information concerning the pictures contained within the VOBU. The VOBU_NGOP parameter identifies the number of GOPs contained within the VOBU. The GOP_PS field contains the picture structure for each GOP and other information relevant to the GOP. Finally, the VOBU_NF preferably sets forth the number of displayed fields to be produced, not in a trick mode, from each picture (1, 2 or 3).

Figure 9:
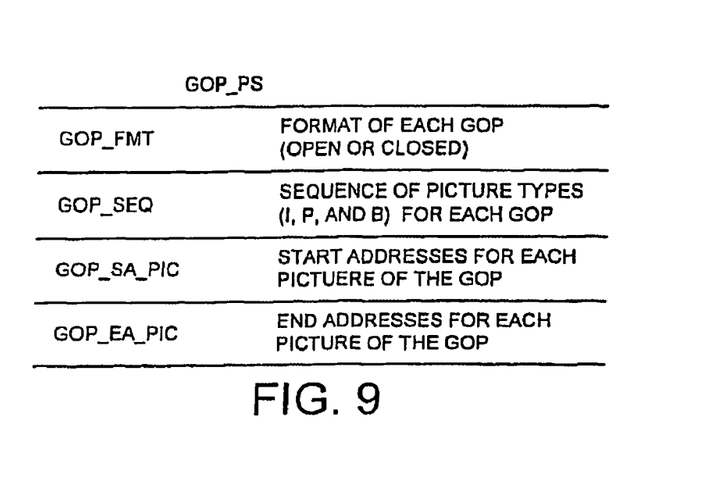
FIG. 9 illustrates the contents of a picture structure (GOP_PS) field for a group of pictures in accordance with the inventive arrangements.

Referring now to FIG. 9, it can be seen that the GOP_PS can comprise a GOP_FMT parameter for identifying the format of each GOP (open or closed); a GOP_SEQ parameter for setting forth the sequence of picture types (I, P, and B) for each GOP; a GOP_SA_PIC parameter for identifying the start addresses for each picture of the GOP; and a GOP_E-A_PIC parameter for setting forth the end address of each picture within the GOP.

With this added information, a new strategy can be derived for decoding and displaying a given VOBU in a trick mode. For example, in a high speed playback mode there may not be sufficient time to play back all of the pictures contained in the VOBU. With the additional SDSI data, the DVD device is better able to determine the optimum sequence of picture playback, given the selected playback speed (2×, 3×, 4×), and the particular format of the VOBU. For example, the minimum number of pictures that spans the whole VOBU can be deduced by counting the number of pictures contained in the VOBU. This information is useful for determining whether there is sufficient time to process and display all of the pictures in the available time for displaying a segment at a selected playback speed. In the alternative, the information can be used to determine whether skipping only the B-pictures will provide the desired playback speed within the available time. This is often a preferred solution since decoding of B-pictures is more time consuming as compared to I and P type pictures.

As a further alternative, if there is not enough time to display all of the I and P pictures, then a fractional part of the VOBU can be displayed. In some cases it may be desirable to play an entire GOP sequence of pictures and then skip playback of a predetermined number of GOPs in a VOBU. The SDSI information permits such playback to be performed in an efficient manner. Alternatively, some modes may require that only the first half of the total number of I and P pictures contained in the VOBU, or some other selected part of the GOP can be displayed. In any event, with the SDSI data, the circumstances can be evaluated by the DVD device player control CPU for determining optimum playback performance before beginning the decoding and display of that audio/video data of a particular VOBU.

Another use of the SDSI information is to better manage the compressed data in memory. Trick mode playback, particularly reverse trick mode playback, can require substantial memory resources. For example, in reverse trick modes, it is often necessary to decode reference pictures at the beginning of a GOP sequence, before it is possible to begin decoding and displaying the pictures toward the end of the sequence. Since the pictures toward the end of the GOP sequence are displayed first, this can result in a number of decoded pictures needing to be stored in memory concurrently. This approach can require significant amounts of memory. Decoded pictures in memory can be overwritten in some cases if memory resources are insufficient. However, this can result in a higher processing load for the decoders. With the SDSI information as described herein, tradeoffs can be made to strike a suitable balance for managing memory resources and processing resources.

Further, knowing the addresses of all of the pictures comprising a GOP provides an opportunity to calculate the size of each picture. If the size of the pictures can be determined in this manner, and the available time to display the pictures is known, then the compressed data buffers of the DVD device can be more effectively managed. For example, use of the track buffer and frame buffer can be optimized for a selected trick mode to select the most suitable strategy for jumping and/or number of pictures that can be held in the buffers. The size information can also be used to determine which pictures will be displayed, which pictures can be held in memory for multiple decoding, and/or how much memory is needed to get the desired picture.

It will be appreciated that the modified navigation pack as described herein can be used with any MPEG recording scheme. In this regard, it should be understood that the invention is not intended to be limited to any particular DVD standard. Moreover, the advanced features taught herein are applicable to other kinds of disk media and disk media players and recorders. Additionally, various modifications of the device illustrated in FIG. 1 and the disk medium illustrated in FIG. 2 can be used together to implement the advanced features taught herein in accordance with the inventive arrangements. In particular, a solution for improved DVD navigation information for improved trick modes in accordance with the inventive arrangements can include modifications of and additions to hardware, firmware and software in the control CPU 122 for recording data to recordable DVD media.

The invention claimed is:

1. A method for providing improved trick mode performance in disc media having a plurality of video object units (VOBU) for storing video content, each said VOBU containing a navigation pack, said method comprising:
   storing on said disc media as a separate packet having its own packet header within each said navigation pack, supplemental disc search information (SDSI) selected from the group consisting of:
      a group of pictures (GOP) structure of the VOBU, wherein said GOP structure further comprises at least one of a format of each GOP contained within said VOBU and a sequence of picture types in each said GOP in the VOBU;
      a number of fields to be displayed from each picture in a normal play mode; and
      a number of groups of pictures (GOP) contained in said VOBU; and
   determining, based on the SDSI, a sequence of picture playback for a user-selected trick mode speed.

2. The method according to claim 1 wherein said picture structure further comprises at least one of:
   a start address for each picture of said VOBU; and
   an end address for each picture of said VOBU.

3. The method according to claim 1 further comprising processing said SDSI for determining selected ones of said pictures contained in said GOP to be presented in response to the user selected trick mode.

4. The method according to claim 1 further comprising using said SDSI for determining a number of pictures contained within each said VOBU.

5. The method according to claim 4 wherein said number of pictures contained within one said VOBU is determined by counting at least I and P pictures contained in the VOBU.

6. The method according to claim 4 further comprising the step of processing said SDSI for determining a selected number of pictures contained in said GOP which can be displayed for the selected trick mode.

7. The method according to claim 6 wherein the step of determining a sequence of picture playback for a given playback speed comprises displaying only I-pictures and P-pictures contained in said GOP if said selected trick mode speed is too fast to permit all pictures within said GOP to be displayed.

8. The method according to claim 6 wherein the step of determining a sequence of picture playback for a given playback speed comprises displaying only a fractional number of I-pictures and P-pictures contained in said GOP if said selected trick mode speed is too fast for displaying all of said I-pictures and P-pictures.

9. The method according to claim 6 wherein said selected pictures contained in said GOP to be displayed in a trick mode are determined before beginning the decoding and display of said VOBU containing said GOP.

10. The method according to claim 1 further comprising the step of processing said SDSI to calculate the size of each picture.

11. The method according to claim 10 further comprising processing said SDSI for managing a data buffer of a disc media device to optimize at least one of a picture jumping sequence and a number of pictures stored in said buffer responsive.

12. The method according to claim 11 further comprising, using said size information the step of determining at least one of: which pictures contained within said GOP are to be displayed, which of said pictures is held in memory for multiple decoding, and how much memory is needed to decode a desired one of said pictures.

13. A disc media device for providing improved trick mode performance comprising:
  means for storing video data on disc media having a plurality of video object units (VOBU), each containing a navigation pack;
  means for storing on said disc media as a separate packet having its own packet header within each said navigation pack, supplemental disc search information (SDSI) selected from the group consisting of:
    a group of pictures (GOP) structure of the VOBU, wherein said GOP structure further comprises at least one of a format of each GOP contained within said VOBU and a sequence of picture types in each said GOP in the VOBU;
    a number of fields to be displayed from each picture in a normal play mode; and
    a number of groups of pictures (GOP) contained in said VOBU; wherein based on the SDSI, a sequence of picture playback for a user-selected trick mode speed is determined.

14. The recordable disc media device according to claim 13 wherein said picture structure further comprises at least one of:
  a start address for each picture of said VOBU; and
  an end address for each picture of said VOBU.

15. The disc media device according to claim 13 further comprising means for processing said SDSI for determining selected ones of said pictures contained in said GOP to be presented in response to the user selected trick mode.

16. The disc media device according to claim 13 further comprising means for processing said SDSI for determining a number of pictures contained within each said VOBU.

17. The disc media device according to claim 16 wherein said number of pictures contained within one said VOBU is determined by counting at least I and P pictures contained in the VOBU.

18. The disc media device according to claim 16 further comprising means for determining based on said SDSI a selected number of pictures contained in said GOP which can be displayed for a selected trick mode.

19. The disc media device according to claim 18 wherein the sequence of picture playback for a given playback speed comprises displaying only I-pictures and P-pictures contained in said GOP if said selected trick mode speed is too fast to permit all pictures within said GOP to be displayed.

20. The disc media device according to claim 18 wherein the sequence of picture playback for a given playback speed comprises displaying only a fractional number of I-pictures and P-pictures contained in said GOP if said selected trick mode speed is too fast for displaying all of said I-pictures and P-pictures.

21. The disc media device according to claim 18 wherein said selected pictures contained in said GOP to be displayed are determined before beginning the decoding and display of said VOBU containing said GOP.

22. The disc media device according to claim 13 further comprising means for processing said SDSI to calculate the size of each said picture.

23. The disc media device according to claim 22 further comprising using said size information of each said picture for managing a data buffer of a disc media device for selecting at least one of a suitable picture jumping sequence and a number of pictures that can be stored in said buffer responsive to a selected trick mode.

24. The disc media device according to claim 23 wherein said processing means uses said size information for determining at least one of: which pictures contained within said GOP are to be displayed, which of said pictures is held in memory for multiple decoding, and how much memory is needed to decode a desired one of said pictures.

* * * * *